United States Patent [19]
Carlson et al.

[11] Patent Number: 5,923,032
[45] Date of Patent: Jul. 13, 1999

[54] INTERALIGNED COMPONENT OPTICAL ENCODER WITH INTEGRAL HOUSING COMPONENT LOCATING STUDS AND SHELF

[75] Inventors: Richard C. Carlson, Plainfield; Edward J. Talbert, Lockport, both of Ill.

[73] Assignee: Oak Industries Inc., Waltham, Mass.

[21] Appl. No.: 08/850,715

[22] Filed: May 2, 1997

[51] Int. Cl.⁶ ........................................................ G01D 5/34
[52] U.S. Cl. .............................. 250/231.13; 250/231.14; 250/239; 341/13
[58] Field of Search .......................... 250/231.13–231.18, 250/237 G, 239; 356/375; 341/13, 31

[56] References Cited

U.S. PATENT DOCUMENTS

| | | |
|---|---|---|
| 3,900,732 | 8/1975 | Costales . |
| 4,338,517 | 7/1982 | Perrine . |
| 4,345,149 | 8/1982 | Blaser . |
| 4,661,698 | 4/1987 | Cappio et al. . |
| 4,712,005 | 12/1987 | Savla . |
| 4,740,691 | 4/1988 | Ushiyama . |
| 4,870,272 | 9/1989 | Wilson, III . |
| 4,965,445 | 10/1990 | Ikeuchi et al. . |
| 5,057,684 | 10/1991 | Service ................................ 250/231.13 |
| 5,089,771 | 2/1992 | Tanguay et al. .................... 250/231.13 |
| 5,708,496 | 1/1998 | Barnett et al. ...................... 250/231.13 |

*Primary Examiner*—Stephone B. Allen
*Attorney, Agent, or Firm*—Greer, Burns, & Crain, Ltd.

[57] ABSTRACT

An improved optical encoder with a simplified construction for reliable component alignment and enhanced resolution is disclosed. The encoder includes a housing with locating points, such as studs and shelves, integrally formed on inner surfaces of the housing. The locating points reliably fix the X, Y and Z axis orientation between a light detector and light source assembly. The light source assembly preferably comprises two light detectors on a single board to increase resolution. Additional features of the invention include a sealed housing and a code wheel having two concentric tracks of transmissive slots that are circumferentially offset from each other and an external cable strain relief assembly.

25 Claims, 4 Drawing Sheets

INTERALIGNED COMPONENT OPTICAL ENCODER WITH INTEGRAL HOUSING COMPONENT LOCATING STUDS AND SHELF

BACKGROUND OF THE INVENTION

The present invention relates generally to optical encoders, and more specifically to an improved optical encoder incorporating a reliable simplified construction, low overall component count, and a component arrangement which reduces errors potentially arising in conventional devices from relative component displacement and light source degradation encountered during operation. An optical encoder constructed according to the present invention achieves increased resolution as one result of these combined features.

Optical encoders are known for use in industrial motion and position sensing applications, such as motor control devices, fluid flow control devices, motion sensing and control devices operating through a shaft, and panel mounted test and/or measurement devices. Consumer applications include such things as computer printers, disk drives, card readers, and ticket dispensers. Generally, optical encoders are potentially useful in any device requiring a speed sensing function, where the speed to be sensed can be linked to a shaft of the optical encoder. In a fluid flow sensing application, for example, the shaft of the optical encoder may be linked to a turbine disposed in the flow of fluid to provide flow rate or volume measurements. The encoder may provide flow direction information as well.

Such encoders typically include a housing enclosing an axially rotating shaft. An opaque code wheel having light transmissive slots is secured to the shaft between a light source and a light detector. Typically, at least two photodetectors are disposed within the housing on the opposite side of the code wheel from one or more light emitting diodes (LEDs). The path of light from the LEDs to the photodetectors is interrupted by opaque portions of the code wheel as the code wheel rotates with the shaft to present a modulated light signal at the photodetectors.

The waveform sensed by the photodetectors therefore reflects the frequency with which the slots in the code wheel permit light to reach those detectors, and is indicative of the speed of shaft rotation. Use of two phase offset sensing channels also permits determination of the direction of shaft rotation.

The present invention relates -to relatively low cost encoders, selling in the range of $20 each, for which the manufacturing tolerances are such that the shaft is subject to radial displacement within its support bushing. This displacement tends to skew the code wheel's orientation relative to the detectors. Accordingly, the transmissive slots in the wheel have a range of misalignment relative to the photodetectors.

Conventional optical encoders typically mount the photodetectors individually in the housing, which increases the potential for misalignment, which in turn reduces the amount of light transmitted to the photodetectors. Because the photodetectors integrate the light signal impinging upon the detectors to produce an electrical signal, a reduction in the amount of light through misalignment increases the minimum response time. The potential for component misalignment is therefore a primary limitation on the resolution of a particular encoder.

In the case of conventional encoders, when the designer or operator needs to change the resolution parameters, the relative positions of the two photodetectors must be changed. This is an operation which is difficult to perform accurately. As such, the resolution of conventional encoders is not readily adjusted.

Yet another disadvantage of conventional optical encoders is that they are susceptible to contamination from dirt and debris which infiltrates the housing and interferes with the modulation and detection of the light beams. As a result, the operational performance of the encoder is reduced because the light intensity of the LEDs is diminished. An additional hazard caused by the infiltration of dust is that the rotational movement of the encoder wheel shaft may be impaired.

Still another disadvantage of conventional encoders is that as many as 35 separate components are required to complete the assembly. Many of these components are required for the positioning and securing of the principal components mentioned above within the housing.

A further disadvantage of conventional optical encoders is that upon the mounting of a cable to the output connector pins or leads, the cable is subject to mechanical strain due to physical manipulation, which has the potential to damage or bend the output leads.

Accordingly, it is an object of the present invention to provide an improved optical encoder having a mechanically improved assembly of fewer components which reduces misalignment difficulties compared to conventional encoders, thereby permitting increased resolution.

A further object of the present invention is to provide an improved optical encoder which uses at least two light detectors mounted upon a single chip, and in which the chip is secured to a housing using locating studs formed integrally with the housing, thereby reducing the potential for relative displacement between the light detectors themselves and between the light detectors and other components of the optical encoder.

A still further object of the present invention is to provide an improved optical encoder having a sealed housing to reduce the potential for infiltration of performance degrading dust and other contaminants within the encoder.

Another object of the present invention is to provide an improved optical encoder in which resolution may be adjusted merely by changing the slot pattern of the encoder wheel.

BRIEF SUMMARY OF THE INVENTION

The above-listed objects are met or exceeded by the simplified optical encoder according to the present invention, which features integrally formed locating points for establishing all positional relationships of operational components within the encoder. In addition, an optical detector is provided featuring two photocells in fixed relationship to each other for greater accuracy and easier assembly.

More specifically, the preferred embodiment of the present optical encoder includes a housing for accommodating a shaft, a light source assembly, a light detector assembly, and a code wheel mounted on the shaft between the light source and light detector assembly. The housing includes a number of integral locating points on its inner surface for aligning and fixing positional relationships between the components. At least one of the light detector assembly and the light source assembly is positioned with the assistance of the locating points.

Preferably, the light detector assembly includes a single chip having two detectors, and is positioned in the housing with the assistance of locating studs. The light detector assembly includes recesses for mating with the studs, and accordingly is positioned within the housing at a precise location such that variances between encoders during manufacturing are small.

Other features of the preferred embodiment include a code wheel having two circumferentially offset tracks of concentric slots for separately modulating the signal from the light source in the encoder, and a sealing mechanism to prevent the infiltration of contaminants within the housing of the optical encoder. These features provide an optical encoder in which the alignment of operational components is highly reliable, and the adverse effects of contaminants and the performance degrading effect of contaminants is avoided.

As a result, the present encoder permits increased resolution and has a reduced part count. Resolution is increased by the fixed orientation of the detectors to each other, thus only small positional tolerances need be accounted for in the sensing and analysis circuitry of the encoder. Part count is reduced since the interlocking nature of the components of the present encoder avoids the need for additional mounting components.

DETAILED DESCRIPTION OF THE INVENTION

Figure 1:
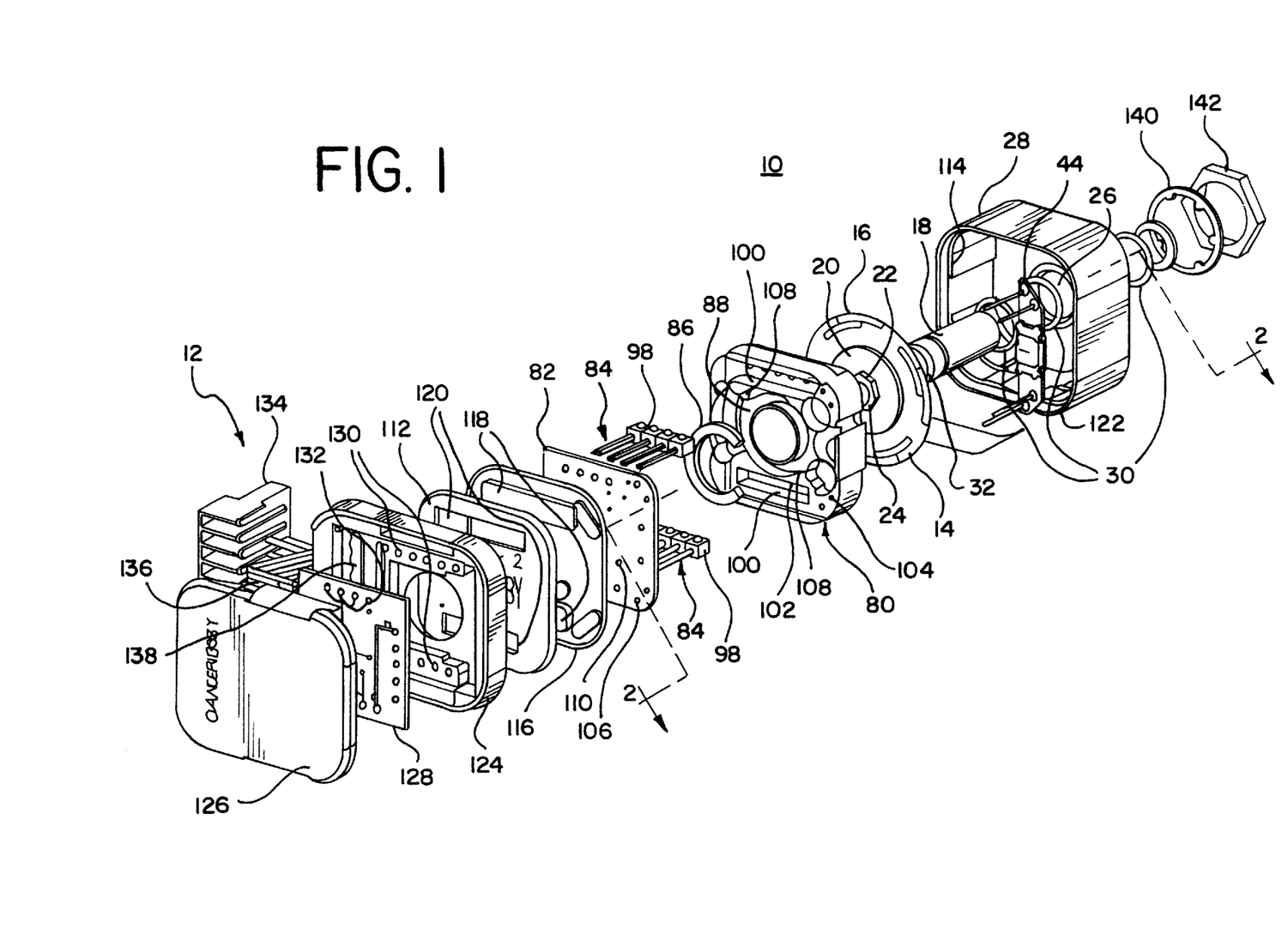
FIG. 1 is an exploded view of an optical encoder and cable strain relief assembly constructed in accordance with the present invention.

An optical encoder 10 including a cable strain relief assembly 12 according to the present invention is shown in FIG. 1. The encoder 10 has a low overall component count, and provides for a reliable alignment between operational components to facilitate increased resolution. Interlocking component relationships are used in the present encoder 10 to minimize component count, and locating aids within the encoder provide controlled relative alignment between operational components of the encoder.

A generally opaque code wheel 14 modulates light as it rotates in proportion to an outside event of interest to provide a signal indicating its speed of rotation. As is the case with conventional encoders, depending upon the arrangement of transmissive portions, or slots 16, and the circuitry and sensors used to sense and analyze the modulated light, information concerning direction of rotation and absolute position may also be obtained. In the preferred embodiment, the code wheel 14 has circumferentially offset tracks 17a, 17b (best seen in FIG. 5) of transmissive slots 16 to permit the production of distinct, offset phase signals as described in greater detail below.

Referring again to FIG. 1, the code wheel 14 is attached to a shaft 18 via complementary retainers 20 (only one shown) that are located on opposite sides of the code wheel 14. A staking or stamping operation is used to connect the retainers together through a hole in a center of the code wheel 14. An end 22 of the shaft 18 is preferably provided with a locator formation 24 for properly orienting the code wheel 14 on the shaft. Alternatively, the end 22 might include a channel for accepting a locking lead, or other suitable means for securing the wheel and retainers 20. The chosen method of attachment must provide a secure friction fit, so that the code wheel 14 rotates with the shaft 18 during operation without slippage.

Prevention of the entry of dust and moisture in a housing shell 28 helps improve operation of the encoder 10 compared to conventional encoders. In encoders lacking a structure for sealing the interior of the housing shell 28, accumulation of dust and moisture can diffuse, dim, or otherwise adversely affect the light necessary for proper encoder operation. This limits the resolution of the encoder, since the adverse influences of such contamination must be compensated for in designing the code wheel 14 and the associated sensing and analysis circuitry. Dust and moisture may also impair the rotation of the shaft 18.

Figures 2, 2A, 3:
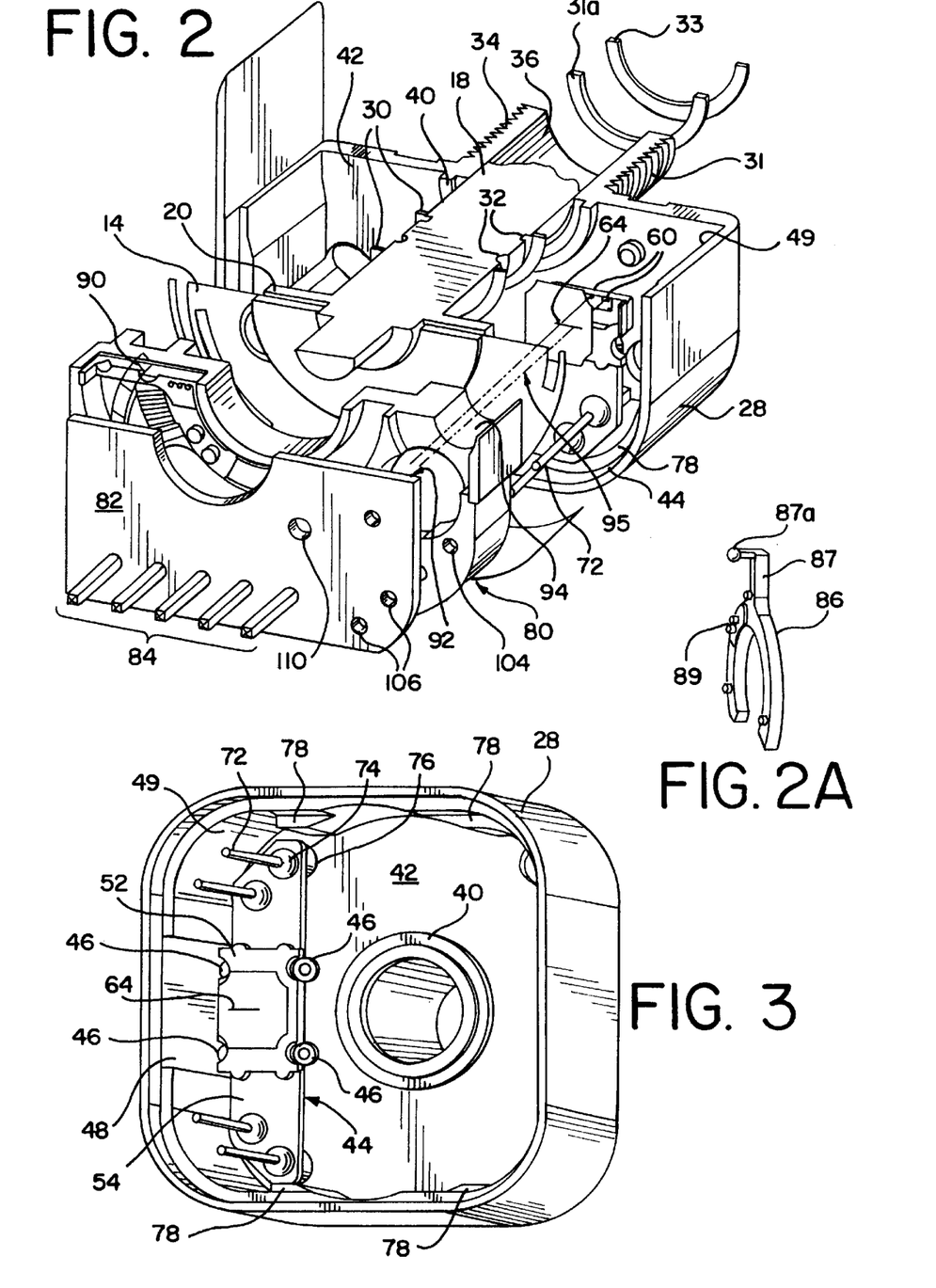
FIG. 2 is a fragmentary perspective sectional view taken along the line 2—2 of FIG. 1 and in the direction indicated generally.
FIG. 2A is an enlarged perspective view of a potentiometer arm suitable for use with the present encoder.
FIG. 3 is a perspective view showing an assembly state of the encoder after mounting of a detector assembly.

The present invention provides barriers to contaminant entry. Since the shaft 18 passes through a shaft hole 26 formed in the housing shell 28, a potential point of contaminant entry exists at the mating points of the shaft 18 and housing shell 28. To prevent such contamination, as an option, one or more O-ring type seals 30 may be provided to fit into channels 32 formed on the shaft 18. Additional channels may be used to accommodate a locking clip 33 (best seen in FIG. 2). Such a clip assists in prevention of longitudinal shaft movement, and is rotationally slidable against the free end of a threaded mounting nipple 31 through the use of a spacer washer 31a. As is best seen in FIG. 2, which is a sectional perspective view taken along line 2—2 in FIG. 1, the seals 30 provide a barrier to dust and moisture entry into the housing shell 28 when the shaft 18 is passed into a bushing 34 integrally formed within the housing shell 28 in the nipple 31. When assembly is complete, the seals 30 engage an inner surface 36 of the bushing 34.

As is also seen in FIG. 2, the housing shell 28 includes an integral shaft spacer 40 that abuts one of the code wheel retainers 20 so that the code wheel 14 is kept at a fixed distance away from an inner surface 42 of the housing shell 28. The distance is large enough to accommodate a detector printed circuit board assembly 44 that mounts upon the inner surface 42.

FIGS. 1–3 together illustrate the relationship between a number of integral locating points formed on inner surfaces of the preferably metal housing shell 28, including the inner surface 42. The advantages of using a metal housing shell 28 include a sturdier encoder which is better able to withstand operational and environmental abuse, and also permits the locating points to be formed with precision. In the preferred embodiment, the housing shell 28 is made via die casting, however other fabricating techniques, such as machining are contemplated. All operational components in the encoder 10 are positioned with the assistance of integral locating points on the housing shell 28. Accordingly, highly exact relative positional relationships are formed between the operational components, since the integral locating points provide highly consistent assembly mounting references and support for operational components.

As seen in FIG. 3, the locating points for the detector printed circuit board assembly 44 comprise a number of studs 46 formed integrally on the inner surface 42 of the housing shell 28. A recess 48 in a sidewall 49 of the shell 28 also helps to position the detector printed circuit board assembly 44.

Figure 4:
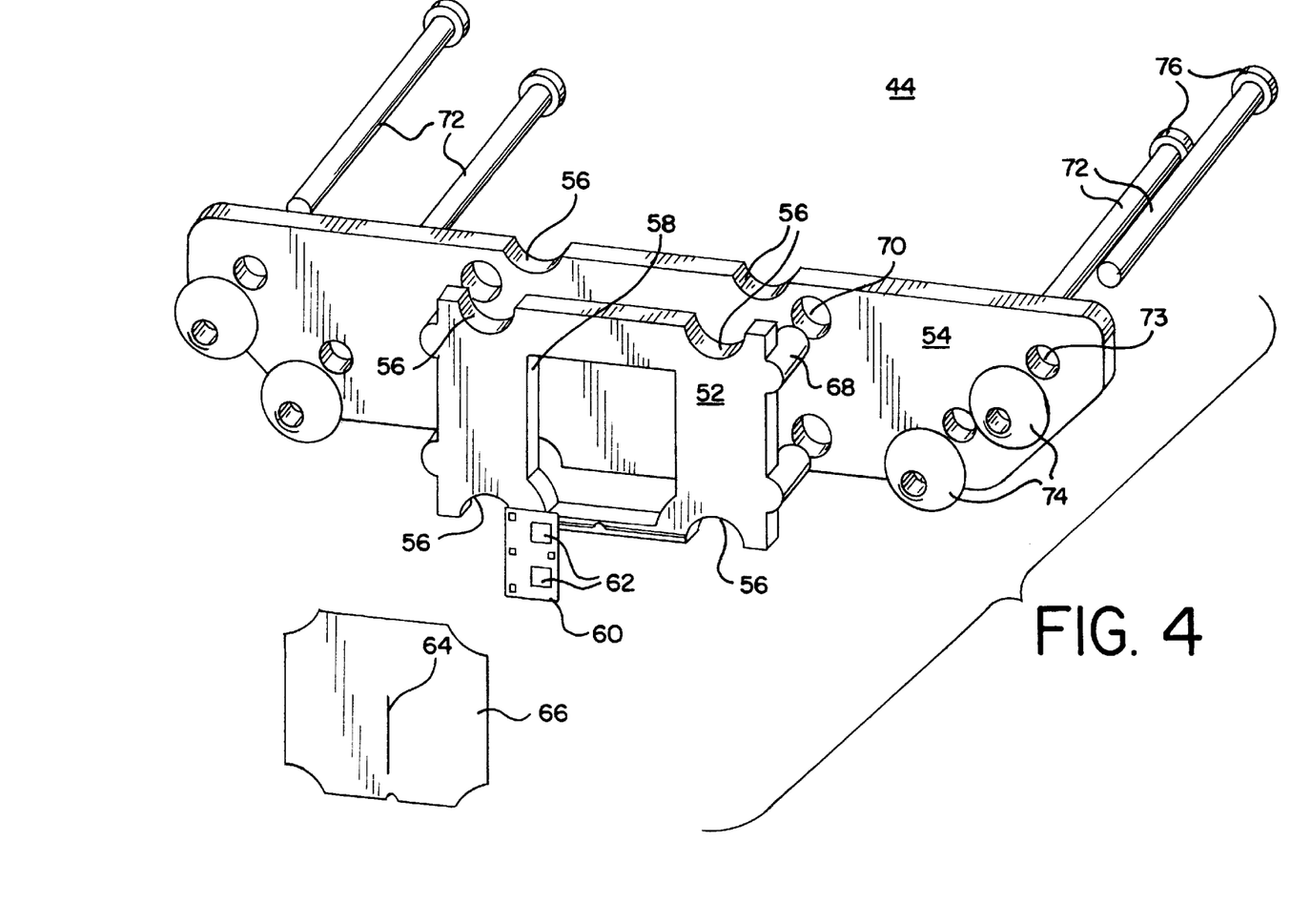
FIG. 4 is an exploded view of the detector assembly of FIG. 3.

Referring now to FIG. 4, a die well 52 and a detector printed circuit board 54 both include radiused recesses 56 (best seen in FIG. 4) that abut the studs 46 to position the detector printed circuit board assembly 44 properly within the housing shell 28. One function of the die well 52 is to encompass, stabilize and protect a photodetector chip 60 from assembly, operational shocks and other damage. To further secure the chip 60 on the circuit board 54, the die well serves as a retainer for a supply of clear epoxy which seals the chip in place. In the preferred embodiment, the chip 60 is positioned on the detector circuit board 54 by automatic vision equipment during assembly.

In the preferred embodiment, the chip 60 is provided with two photodetectors 62 which are preferably photodiodes with Schmitt Trigger circuitry. During operation, both of the photodetectors 62 receive light through a single transparent slit 64 formed in an otherwise opaque shield 66 that fits in the die well 52. Another function of the die well 52 is to provide, through a die well opening 58, a mounting point for the transparent slit 64 in the opaque shield 66 which properly aligns the slit over the chip 60.

To secure the die well 52 to die detector printed circuit board 54, a friction connection is formed through a peg 68 and hole 70 arrangement. If desired, the connection may be supplanted by chemical adhesive. The detector printed circuit board assembly 44 is completed by inserting detector leads 72 through lead holes in the printed circuit board 54. The leads 72 are soldered in place at points 74 at a point on each lead such that there is sufficient protrusion of each lead on the reverse side of the circuit board 54 to provide structural strength to the board.

Referring now to FIG. 3, the base portions 76 also hold the detector printed circuit board assembly 44 at a fixed distance from the inner surface 42 of the housing shell 28. It will be seen that the trapezoidal configuration of the detector printed circuit board 54 facilitates the locating of the board within the housing shell 28, and ensures that assembly personnel will place the board in the proper orientation. When assembly is complete, the locating points, including the studs 46 and recess 48, reliably place the slit 64 and the photodiodes 62 within a light path defined between the detectors 62 and a light source within the housing shell 28.

After the detector printed circuit board assembly 44 has been mounted in the housing shell 28 as shown in FIG. 3, the code wheel 14 is mounted in the housing shell 28 by passing the shaft 18 through the bushing 34, and preferably attaching the locking clip 33. This results in the assembly state shown in FIG. 5. The location of the detector leads 72 near peripheral edges of the detector circuit board 54 allows the code wheel 14 to rotate without interference from the leads.

Figure 5:
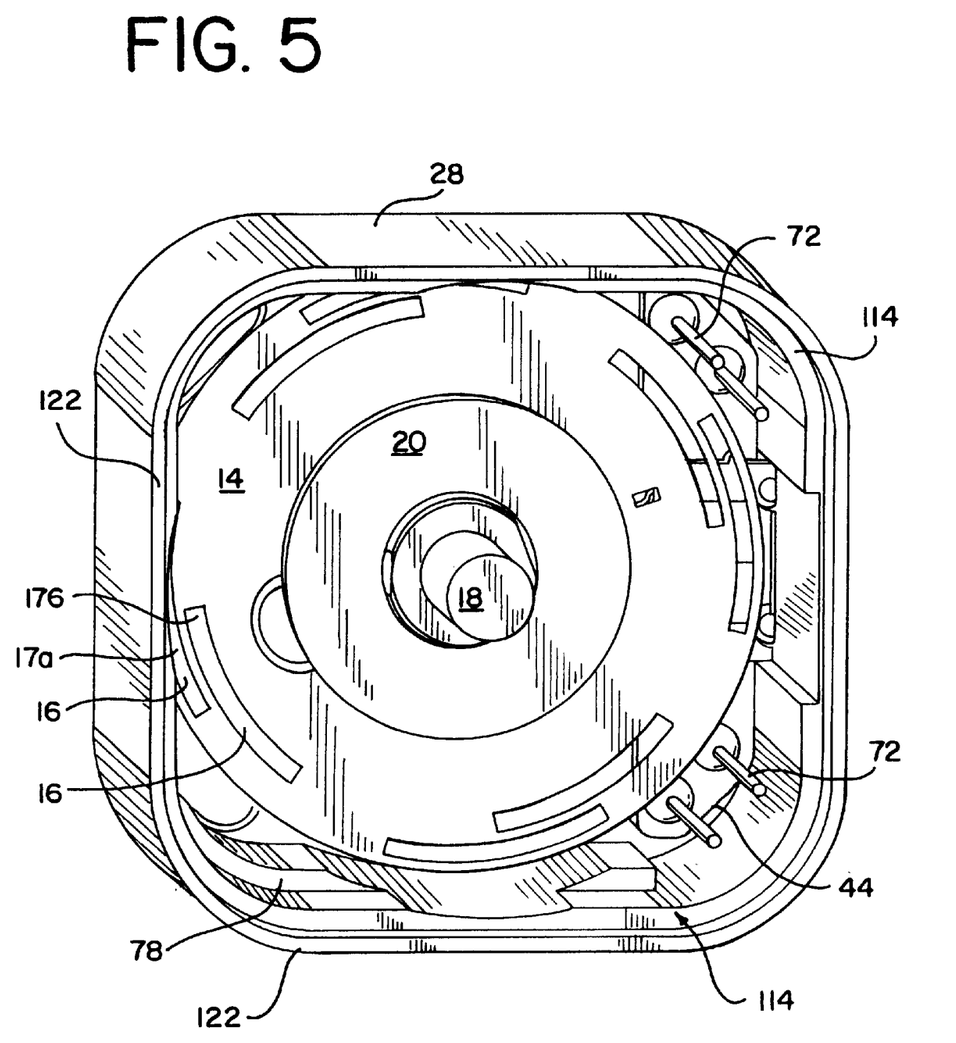
FIG. 5 is a perspective view showing and assembly state of the encoder after mounting of the detector assembly and a code wheel.

As shown in FIGS. 3 and 5, the housing shell 28 defines additional locating points in the form of an integrally formed holder shelf 78 disposed on the inner sidewall 49. In similar fashion to the studs 46 and the recesses 48, the integral holder shelf 78 is preferably formed with the housing shell 28 via die casting to provide an accurate reference location to facilitate relative component positioning.

As seen in FIGS. 1, 2 and 2A, the integral holder shelf 78 accommodates and locates an LED printed circuit board holder 80, having a circumference corresponding in shape to closely fit the shape defined by inner portions of the housing shell 28 above the holder shelf 78. The holder 80 completes the relative positioning of operational components in the encoder 10 by providing locations for mounting an LED (light emitting diode) printed circuit board 82 and related components including connector leads 84 and a potentiometer arm 86.

As is best seen in FIG. 2A, the potentiometer arm 86 is generally horseshoe shaped to circumscribe the path of the shaft 18. A radially projecting "L" shaped actuator arm 87 is integrally formed with the arm 86 and has a tab portion 87a which projects in a parallel direction to the shaft 18. The potentiometer arm 86 is rotatably accommodated in an indexed arm well 88 formed in the holder 80. A wiper arm 89 projects in the same direction as the tab portion 87a to engage a potentiometer resistor pad (not shown) on the adjacent surface of the LED printed circuit board 82. The arm well 88 includes a plurality of ratchet-type index formations 90 (best seen in FIG. 2) arranged in an arc within the arm well 88 to engage the actuator arm 87. A plurality of selectable positions are thus provided for the potentiometer arm 86 which define a plurality of intensities for an LED 92 (FIG. 2) that acts as the light source for the encoder 10, since the potentiometer arm 86 contacts and completes the variable resistor on the adjacent surface of the LED printed circuit board 82. This provides a manufacturing convenience, allowing the output of the LED 92 to be adjusted at the factory to adjust LED brightness as required for special applications.

Referring now to FIG. 2, a bore-like light hole 94 disposed in the holder 80 provides a light path 96 extending from the LED 92 through the slit 64 and ultimately to both of the photodetectors 62. Rotation of the code wheel 14 by an external rotational force applied to the shaft 18 modulates the light emitted from the LED 92. Use of two concentric tracks 17a, 17b of the slots 16 (best seen in FIG. 5) provides two separate modulation signals to the photodetectors 62, and the resulting offset between the signals detected by each of the photodetectors permits the detection of rotation direction as well as speed. Also, due to the fixed nature of the photodetectors 62 on the chip 60, the resolution of the encoder 10 may be accurately altered by merely providing code wheels 14 with varying patterns of the slots 16.

Referring now to FIGS. 1 and 2, each set of connector leads 84 is protected by a connector cap 98 that provides rigidity to the assembled connector leads 84. In the preferred embodiment, the connector caps 98 are molded together of plastic into a single unit which fits into a corresponding connector cap recess 100 defined in the holder 80. The recess 100 includes a corresponding number of connector lead holes 102 for accommodating ends of each of the connector leads 84. The connector leads 84 also extend through and contact a circuit on the LED printed circuit board 82. In addition, the circuit on the LED printed circuit board 82 is contacted by the detector leads 72 which extend through corresponding detector lead holes 104 in the holder 80 and into contact holes 106 in the LED printed circuit board 82.

An additional feature of the present encoder 10 is that the connector caps 98 are molded to the leads 84 to be closer to the lead end adjacent the inner housing surface 42 than to the opposite lead end. This is contrary to traditional practice, and provides longer leads projecting through the housing for reasons to be described below.

Preferably, the detector lead holes 104 are chamfered to easily accept the detector leads 72, and the contact holes 106 are metallized. Soldering of the detector leads 72 to the circuit on the LED printed circuit board 82 preferably completes connection, and also locks the holder 80 onto the shelf 78 at a fixed distance from the detector assembly 44, while simultaneously locking other components into place between the holder 80 and the LED printed circuit board 82. Such metallization and soldering may also be used to make electrical contact between the connector leads 84 and the LED printed circuit board 82. The solder connection is most easily made in both cases on the side of the LED printed circuit board 82 facing away from the holder 80 after the LED printed circuit board 82 is fit into the holder 80. This fitting of the LED printed circuit board 82 into the holder 80 is assisted by a snap-fit arrangement, with protrusions 108 frictionally locking into snap-fit holes 110 (best seen in FIG. 1).

Artisans will appreciate that all positional relationships in the encoder 10 are fixed when the holder 80 with the LED circuit board 82 attached is placed onto the shelf 78. The holder 80, shelf 78, studs 46, and the unique component relationships created by the mating of leads, holes, recesses, etc. creates a consistent and definite positional relationship between the code wheel 14, the LED 92, and the detectors 62. Since the locating points in the housing shell 28 are integrally formed, little variance is experienced during manufacturing, thus permitting the overall resolution of the encoder to be increased. Another advantage of the present encoder 10 is that part counts are also low since uniquely defined relationships between the components are primarily relied upon for fitting the components together.

Referring now to FIG. 1, once all operational components are fixed within housing shell 28 after snap-fitting of the holder 80 and soldering of the LED printed circuit board 82, the assembly of the encoder 10 is completed by attaching a cover plate 112 to the housing shell 28. The cover plate 112 rests upon a separate cover shelf 114 (best seen in FIG. 5) integrally formed in the housing shell 28. To complete the sealing of the encoder from moisture and dust contaminants, a gasket 116 is pinned between the cover plate 112 and the LED printed circuit board 82, which has a surface which is generally flush with the cover shelf 114.

The gasket 116 is preferably made of flexible polymeric material such as silicone rubber or fluoro silicone gasketing material, both of which are well known to skilled practitioners. Included on the gasket 116 are one or more boss formations 118 which wedge into corresponding slot-like apertures 120 in the cover plate 112. Each of the boss formations 118 has a plurality of covered apertures which are designed to be punctured by the output leads 84 to provide a scaled external connection point to the encoder 10. Unpunched portions of the formations 118 remain sealed, so that the same gasket can be used with a variety of encoder lead configurations. The cover plate 112 and gasket 116 are locked onto the shelf 114 by crimping an extended portion 122 of the shell housing 28 over a peripheral edge of the cover plate.

Another feature of the encoder 10 is a cable strain relief assembly 12 which is mounted outside the cover 112. The cable strain relief assembly 12 includes mating inner and outer cover pieces, respectively 124 and 126, and provides a mounting location for a supplemental custom signal processing circuit board 128. By providing the supplemental circuit board 128 in the cable strain relief assembly 12 permits a standard encoder package to include modified circuitry for a given application, without changing any of the components included within the sealed housing shell 28. In the preferred embodiment, the outer cover piece 126 preferably snap fits onto the inner cover piece 124 after the supplemental circuit board 128 has been soldered to the connector leads 84 to lock the board in place, and simultaneously pins the inner cover piece 124 against the cover plate 112. The connector leads 84 pass through cover piece holes 130 and into connector holes 132 on the custom printed circuit board 128.

An external connector 134 is preferably electrically connected to the custom printed circuit board 128 and/or the connector leads 84 through a plurality of cables 136. The cables are preferably flat so that they may be bent over a buckle bar 138 located on the inner cover piece 124. This bending over a rigid buckle bar 138 resists strain placed upon the connector 134 and cables 136 so that the integrity of connection to the custom printed circuit board 128 and/or the connector leads 84 is maintained. Upon final assembly, the encoder 10 is mounted to a panel or other end product (not shown) through the use of a lock washer 140 and a lock nut 142 (best seen in FIG. 1), the latter threadably engaging the threaded nipple 31 (best seen in FIG. 2).

Thus, it will be seen that the present encoder is made of fewer components, and as such is less expensive to manufacture and easier to assemble than conventional encoders. Also, by placing the two detectors in a fixed relationship to each other, the resolution of the encoder may be accurately changed merely be replacing the existing code wheel 19 with a new wheel having a different arrangement or pattern of transmission slots 16. The present encoder also features a cable strain relief assembly with a supplemental circuit board to enable the encoder to be applicable to a wide variety of applications. Also, the shell housing 28 is provided with several component locator formations, as well as the gasket 116 to protect internal components.

While a particular embodiment of the optical encoder with simplified construction of the invention has been shown and described, it will be appreciated by those skilled in the art that changes and modifications may be made thereto without departing from the invention in its broader aspects and as set forth in the following claims.

We claim:
1. An optical encoder, comprising:
   a rotatable shaft;
   a light source assembly including at least one light source:
   a light detector assembly including at least one light detector disposed within a light path defined by light emissions from said light source;
   a code wheel disposed between said light source and said light detector and being rotatable with said shaft; and
   a housing accommodating said shaft and including locating points on an inner surface thereof for aligning internal components, including at least one of the light detector assembly and the light source assembly;
   wherein said locating points comprise studs integrally formed in said housing and extending from said inner surface thereof, said housing includes at least two of said studs, and said light detector assembly includes a detector circuit board having at least two locator recesses for engaging said studs.
2. The optical encoder according to claim 1, wherein said locator recesses are radiused recesses formed along one or more edges of said detector circuit board.
3. The optical encoder according to claim 1 wherein said detector circuit board is a one piece board with two light detectors disposed thereon.
4. An optical encoder, comprising:
   a rotatable shaft;
   a light source assembly including at least one light source;

a light detector assembly including at least one light detector disposed within a light path defined by light emissions from said light source;

a code wheel disposed between said light source and said light detector and being rotatable with said shaft;

a housing accommodating said shaft and including locating points on an inner surface thereof for aligning internal components, including at least one of the light detector assembly and the light source assembly; and detector leads extending from said detector assembly and into contact holes within said light source assembly, said leads being located in said housing so as to permit free rotation of said code wheel.

5. An optical encoder, comprising:

a rotatable shaft;

a light source assembly including at least one light source;

a light detector assembly including at least one light detector disposed within a light path defined by light emissions from said light source;

a code wheel disposed between said light source and said light detector and being rotatable with said shaft; and a housing accommodating said shaft and including locating points on an inner surface thereof for aligning internal components, including at least one of the light detector assembly and the light source assembly;

wherein said detector assembly further comprises a die well on said circuit board for encapsulating a detector circuit chip.

6. An optical encoder, comprising:

a rotatable shaft;

a light source assembly including at least one light source;

a light detector assembly including at least one light detector disposed within a light path defined by light emissions from said light source;

a code wheel disposed between said light source and said light detector and being rotatable with said shaft; and a housing accommodating said shaft and including locating points on an inner surface thereof for aligning internal components, including at least one of the light detector assembly and the light source assembly;

wherein said housing comprises an integral one-piece elongated shell defining a volume therein for containing said internal components, said shell having an open end and an integral shaft bushing at an opposite end, and a cover plate which mates with said open end, said cover plate having at least one slot aperture.

7. The optical encoder according to claim 6, wherein at least one of said housing and said cover plate are metal.

8. The optical encoder according to claim 6, further comprising a gasket for creating a seal between said shell and said cover plate.

9. The optical encoder according to claim 8, wherein said gasket includes at least one integral formation configured for being wedged into said slot aperture.

10. The optical encoder according to claim 8, wherein said gasket has openings in said integral formation through which connector leads sealingly pass.

11. An optical encoder, comprising:

a rotatable shaft;

a light source assembly including at least one light source;

a light detector assembly including at least one light detector disposed within a light path defined by light emissions from said light source;

a code wheel disposed between said light source and said light detector and being rotatable with said shaft; and a housing accommodating said shaft and including locating points on an inner surface thereof for aligning internal components, including at least one of the light detector assembly and the light source assembly;

wherein said locating points comprise a shelf portion integrally defined inside said housing, said encoder further including a holder defining a recess for holding said light source assembly and having a plurality of detector lead holes; said shelf portion supporting said holder; and detector leads extending from said light detector assembly through said detector lead holes to contact a circuit formed on said light source assembly.

12. The optical encoder according to claim 11, wherein said light source assembly is mounted in said holder and said encoder further comprises an arm well formed in said holder including index formations; and a potentiometer arm contacting and completing a variable resistor included in a light source circuit of said light source assembly and movably disposed in said arm well to engage said index formations, thereby providing a plurality of predetermined potentiometer arm positions for selecting a particular resistance to adjust said light source circuit.

13. The optical encoder according to claim 11 wherein said light source assembly includes a light source circuit board, and said encoder further comprises connector leads extending through said circuit board and into connector lead holes formed in said holder.

14. The optical encoder according to claim 13, further comprising snap fit means for connecting said circuit board to said holder.

15. The optical encoder according to claim 13, further comprising a rigid connector lead cover cap extending from said light source circuit board between said circuit board and said holder, said cover cap located closer to one end of said leads to define a longer connector lead dimension for extending through said cover cap and into said connector lead holes.

16. The optical encoder according to claim 15, further comprising a cover cap recess formed integrally in said holder for accommodating said cover cap.

17. The optical encoder according to claim 15, wherein said housing includes a cover plate which mates with an open end of said housing, said cover plate having at least one slot aperture through which said connector leads extend out of said housing.

18. The optical encoder according to claim 17 further comprising a gasket for creating a seal between said shell and said cover plate, said gasket having openings aligned with said at least one aperture through which said connector leads sealingly pass.

19. An optical encoder comprising:

a rotatable shaft;

a light source assembly including at least one light source;

a light detector assembly including two light detectors formed upon a single chip and disposed within a light path defined by light emissions from said light source;

a code wheel disposed between said light source and said light detectors and being rotatable with said shaft; and a housing for accommodating said shaft and enclosing said light source assembly, said light detector assembly and said code wheel;

wherein said code wheel includes two concentric circular tracks of transmissive slots which are circumferentially offset with respect to each other.

20. An optical encoder comprising:

a rotatable shaft;

a light source assembly including at least one light source;

a light detector assembly including two light detectors formed upon a single chip and disposed within a light path defined by light emissions from said light source;

a code wheel disposed between said light source and said light detectors and being rotatable with said shaft; and a housing for accommodating said shaft and enclosing said light source assembly, said light detector assembly and said code wheel;

wherein said light detector assembly includes a circuit board provided with a protective die well and said chip is placed in said well.

21. An optical encoder comprising:

a rotatable shaft;

a light source assembly including at least one light source;

a light detector assembly including two light detectors formed upon a single chip and disposed within a light path defined by light emissions from said light source;

a code wheel disposed between said light source and said light detectors and being rotatable with said shaft;

a housing for accommodating said shaft and enclosing said light source assembly, said light detector assembly and said code wheel;

locating studs integrally formed in said housing and extending from an inner surface thereof; and recesses formed in said detector assembly for engaging said locating studs to locate said detector assembly within said housing.

22. An optical encoder comprising:

a rotatable shaft;

a light source assembly including at least one light source;

a light detector assembly including two light detectors formed upon a single chip and disposed within a light path defined by light emissions from said light source;

a code wheel disposed between said light source and said light detectors and being rotatable with said shaft;

a housing for accommodating said shaft and enclosing said light source assembly, said light detector assembly and said code wheel;

a holder defining a recess for holding said light source assembly; and a shelf portion integrally defined inside said housing for supporting said holder.

23. An optical encoder comprising:

a rotatable shaft;

a light source circuit board including at least one light source;

a light detector assembly a light detector disposed within a light path defined by light emissions from said light source;

a code wheel disposed between said light source and said light detectors and being rotatable with said shaft;

a housing for accommodating said shaft and enclosing said light source assembly, said light detector assembly and said code wheel;

connector leads extending through said light source circuit board and out an aperture in said housing; and a cable strain relief assembly attached to said housing through a connection to said connector leads.

24. The optical encoder according to claim 23, wherein said cable strain relief assembly includes a supplemental circuit board accessible through a removable cover piece.

25. The optical encoder according to claim 23, wherein said cable strain relief assembly includes a buckle bar for folding lead wires that connect to the encoder to provide mechanical resistance to external forces applied to said lead wires.

* * * * *